Aug. 6, 1935.  D. B. BAKER ET AL  2,010,052
TWO-MAN SEAT FOR TRACTORS
Filed Jan. 14, 1935  3 Sheets-Sheet 1
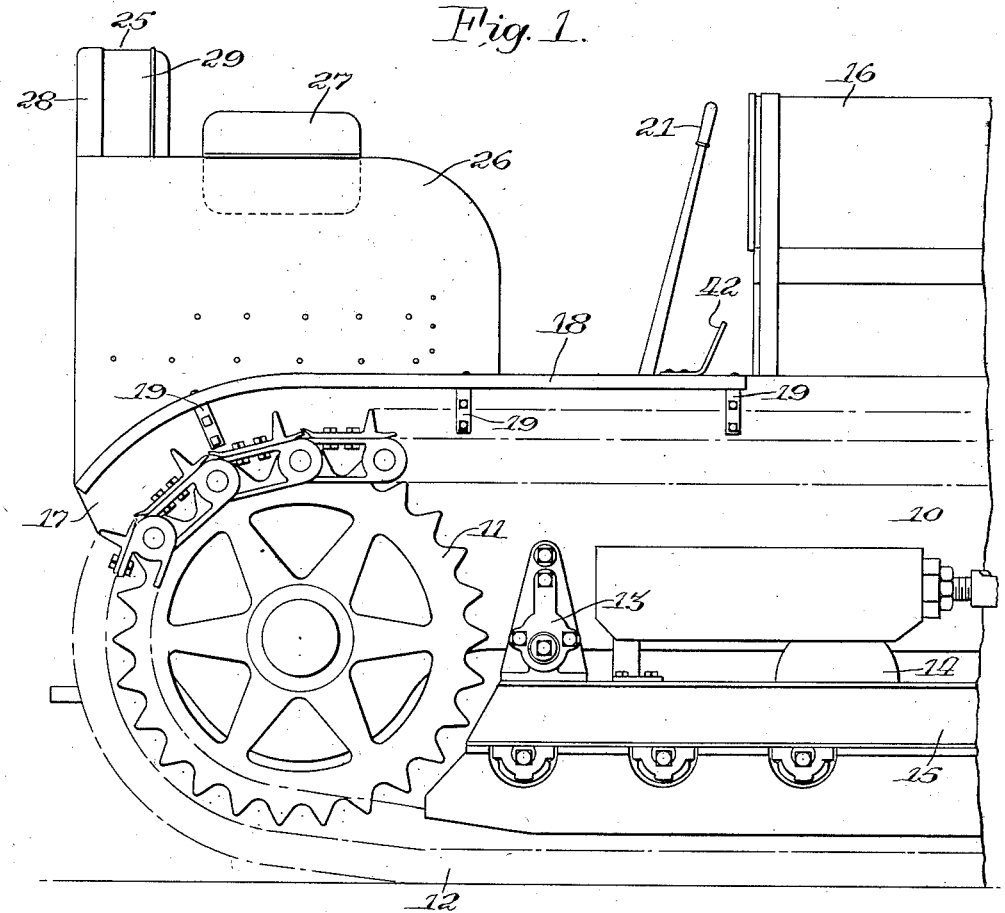
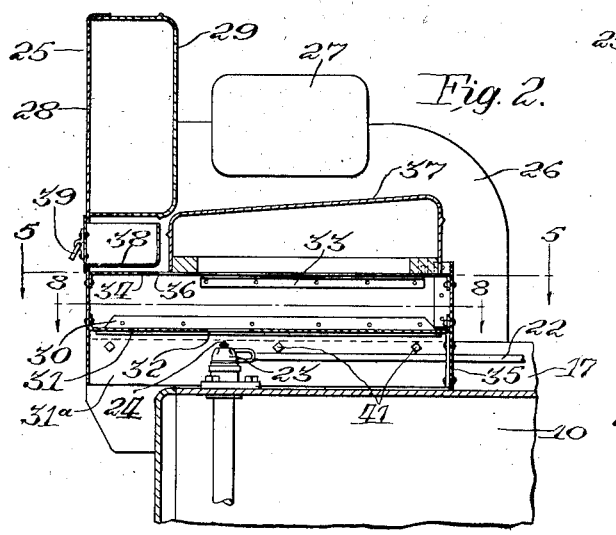
Inventors
David B. Baker,
Clifford R. Rogers,
and Norman O. Panzegrau
By V. F. Lassagne
Atty

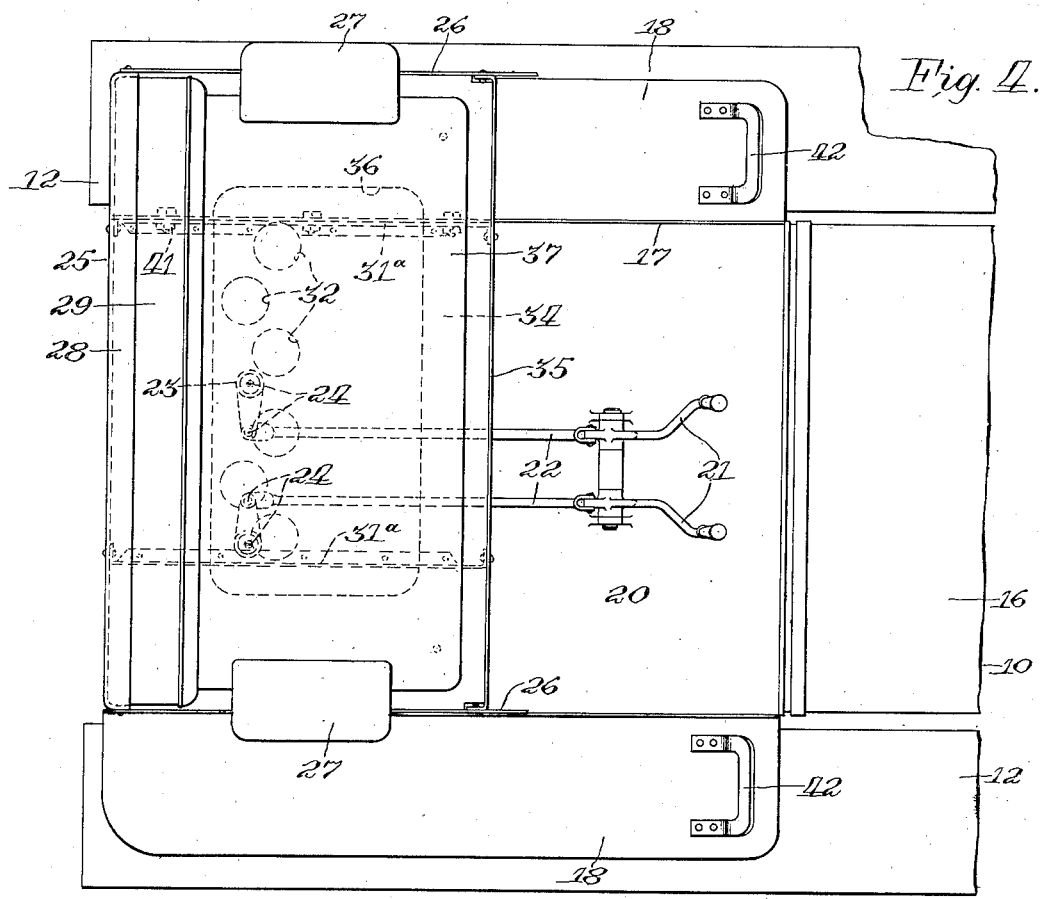
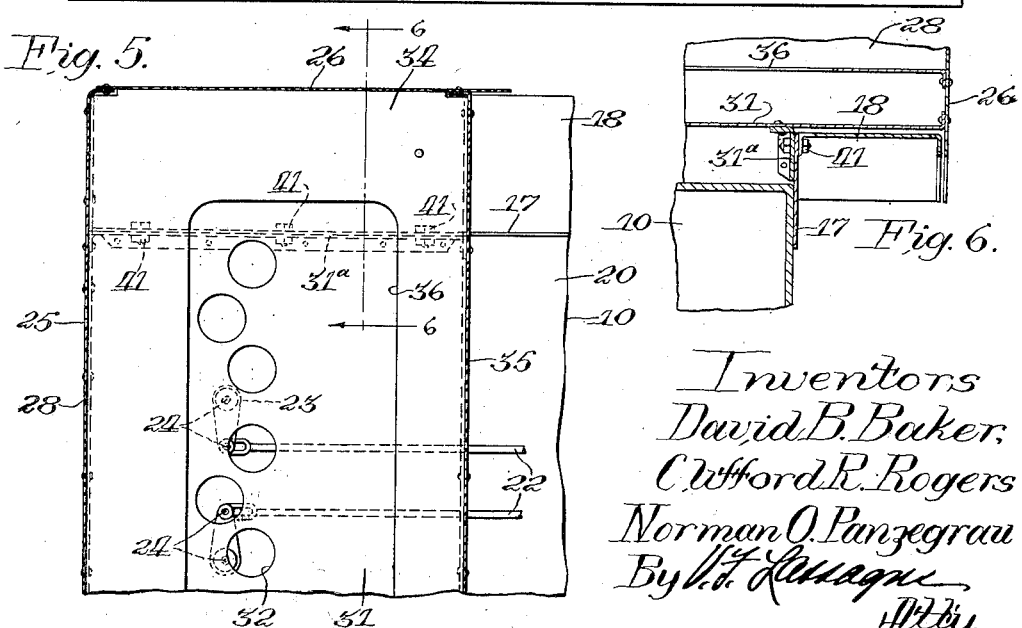

Aug. 6, 1935.  D. B. BAKER ET AL  2,010,052
TWO-MAN SEAT FOR TRACTORS
Filed Jan. 14, 1935   3 Sheets-Sheet 3
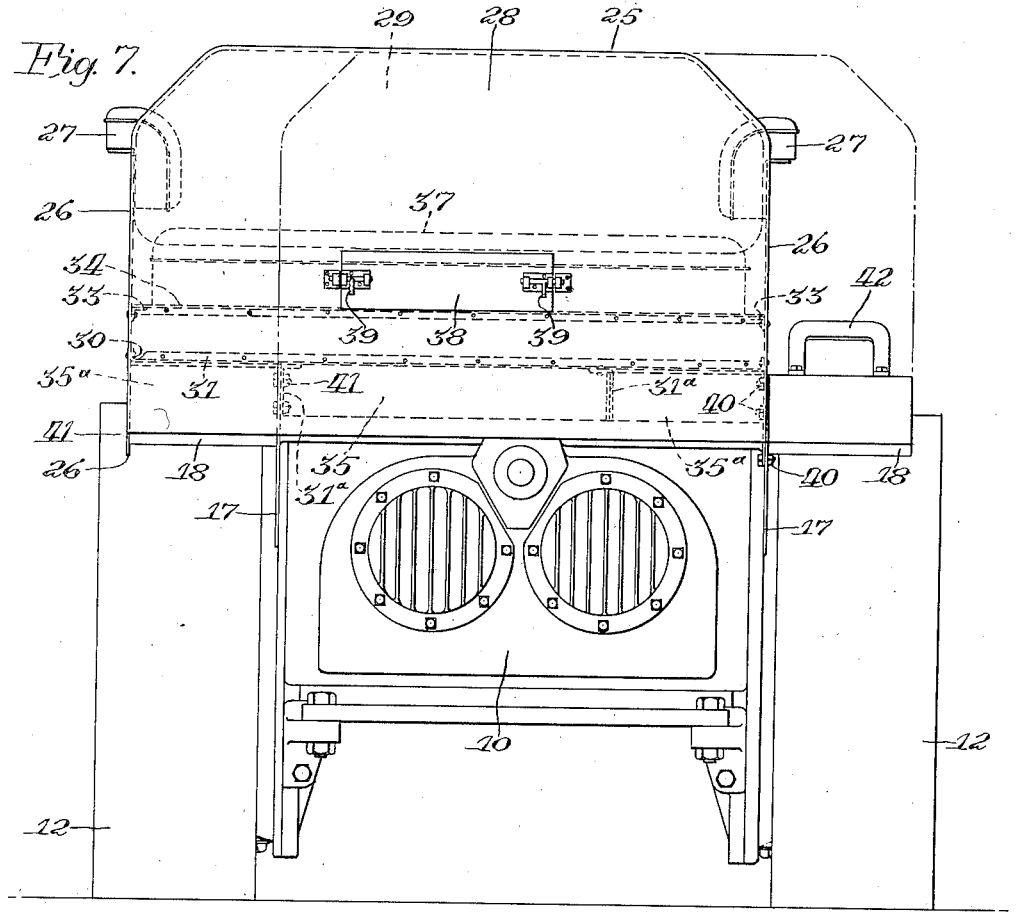
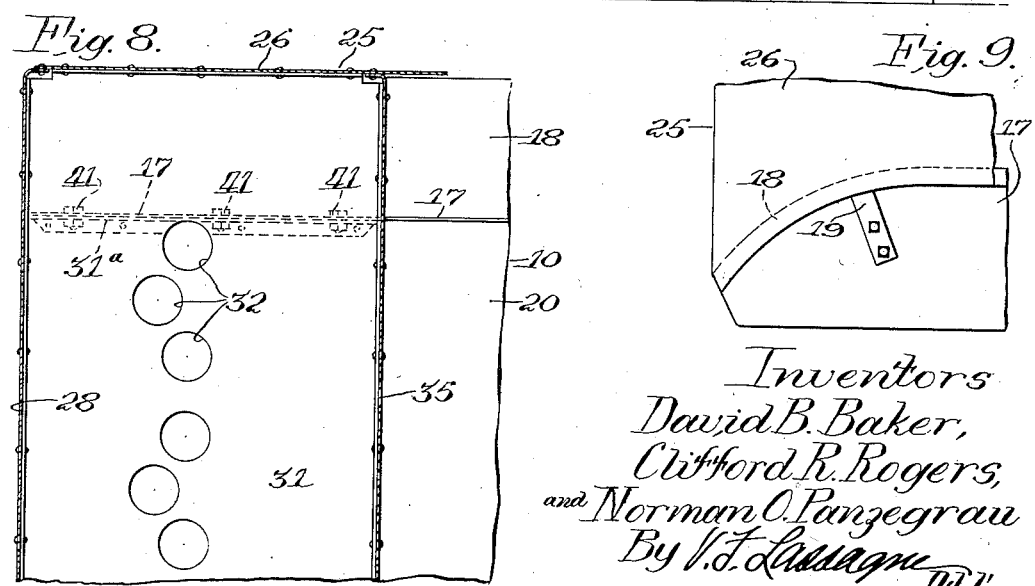
Inventors
David B. Baker,
Clifford R. Rogers,
and Norman O. Panzegrau
By V. T. Lassagne
Atty.

Patented Aug. 6, 1935

2,010,052

UNITED STATES PATENT OFFICE 2,010,052

TWO-MAN SEAT FOR TRACTORS

David B. Baker, Riverside, Norman O. Panzegrau, Chicago, and Clifford R. Rogers, Oak Park, Ill., assignors to International Harvester Company, a corporation of New Jersey Application January 14, 1935, Serial No. 1,596

6 Claims. (Cl. 180—54)

The invention relates to an improved seat structure for tractors generally, but particularly of the crawler type.

These crawler tractors comprise a body carrying a motor at the forward end thereof with a fuel tank rearwardly of the motor. At the rear end of the body is a seat and at the sides are longitudinal fenders. Thus, the space between the fenders, the seat, and fuel tank forms an operator's compartment wherein are located the usual control levers for operating the tractor. The usual seat is so positioned that the tractioneer may sit comfortably behind the controls.

When the tractor is operating a snow plow, bull-dozer, street sweeper or other attachment, it is required to place a second man on the seat to operate the controls for such attachment. As the standard seat is not designed to be occupied by two men, the problem of comfort for both men in handling their respective controls immediately becomes of importance.

Accordingly, the main object of the invention is to provide an improved two-man seat for crawler tractors, which will enable the tractioneer to be located in a comfortable position behind his controls, while the second man will be located in a comfortable position for operating the controls for an attached implement.

Another object is to provide such seat, which may be located in an offset position relative to the longitudinal center line of the operator's compartment.

Still another object is to provide such two-man seat capable of being positioned offset relative to said center line, whereby the extra man may be located over either fender and whereby the controls for an attached implement may be handled from that side of the tractor where they happen to be located.

Other important objects will be apparent, such, for example, as would relate to fastening the seat in either offset position; and, making certain oil fittings under the seat accessible in either position of the seat without having to remove the same.

A practicable embodiment of the invention is shown in the accompanying sheets of drawings, wherein it will be seen that the seat structure serves to close the rear end of the operator's control compartment and is of a width to be occupied comfortably by two men. Fastening means is provided for mounting said seat in offset position relative to the center line of the tractor, so that one end thereof is located over a fender, as shown. Below the seat cushion are a large storage compartment and a bottom having a number of holes therein, a certain number of which will always be located, in either offset position of the seat, to make accessible certain grease fittings without having to remove the seat structure.

In the drawings:

Figure 1 is a side elevational view of so much of the rearward portion of a crawler tractor as is necessary to illustrate the invention;

Figure 2 is a longitudinal central side sectional view through the seat structure as it appears mounted on the tractor;

Figure 3 is a detail longitudinal view, partly in section, to show how one of the seat side members fastens to a tractor body side plate;

Figure 4 is a plan view of the tractor and seat structure, as shown in Figure 1;

Figure 5 is a horizontal sectional view through the seat structure taken along the line 5—5 of Figure 2, looking in the direction of the arrows;

Figure 6 is a detail cross sectional view taken along the line 6—6 of Figure 5, looking in the designated direction;

Figure 7 is a rear elevational view of the tractor, showing the seat in full lines in one offset position, and, in the dotted lines, showing said seat in its other offset position;

Figure 8 is a horizontal sectional view similar to Figure 5, but taken along the section line 8—8 of Figure 2, looking in the direction of the arrows; and, Figure 9 is another detail view similar to Figure 3, to show how a seat side member overhangs the edge of an adjacent fender.

The crawler tractor shown has a body 10 carrying at its rear driving sprocket wheels 11 (only one being shown), around which are the crawler tracks 12. The body's weight is transmitted through a rear connection 13 and a front connection 14 to the side roller track frames 15 to the ground stretch of the track 12. This structure is the same on both sides.

Rearwardly of the motor, which is not shown, the tractor body carries a transverse fuel tank 16, and at its sides the body 10 has secured thereto the longitudinally extending, vertical sheet metal body side plates 17, to which are secured longitudinal fenders 18 by means of a number of brackets 19. These fenders extend substantially from the position of the fuel tank 16 to the rear end of the tractor and with the tank 16 form an operator's compartment 20, wherein are located steering control levers 21 for operating rearwardly extending, horizontal links 22, which in turn operate cranks 23, with which are associated grease nipples 24, that require lubrication from time to time.

The rear open end of this operator's compartment 20 is closed by the improved two-man seat generally shown at 25. This seat is transversely disposed and comprises metal side walls 26 carrying arm rests 27. The seat structure also includes a rear wall 28, to which is secured a back rest 29. The side walls 26 have secured thereto by riveting or welding horizontal angle bar brackets 30, to which is secured a horizontal false bottom 31 having a series of transversely arranged holes 32 formed therein for a purpose later to appear. This false bottom 31 is raised above the lower edge of the back and sides of the seat, as shown in Figure 2, to provide clearance for the parts 22, 23 heretofore described.

Above the bottom 31 the sides 26 carry angle iron brackets 33 for carrying a raised bottom plate 34. The substantial space between these horizontal plates 31 and 34 provides an easily accessible, roomy compartment for storing large tools, ropes, drawbar pins, chains, crowbars and the like. Both of the plates 31 and 34 have their rear edges bent to form flanges, which are secured to the back plate 28, as shown in Figure 2. Similarly, the forward edges of these spaced bottom plates 31 and 34 are bent or flanged and similarly fastened by riveting or welding to a transverse, vertical front wall plate 35, which is substantially no higher than the level of the seat support plate 34. This plate 35 is cut away at its ends, as shown at 35ᵃ. Adjacent the inner edge of each cut-out 35ᵃ there is fastened to the under side of the plate 31 a longitudinal, vertical wall 31ᵃ, of which there are two, as clearly appears in Figures 4, 7 and 8. The purpose of these wall members 31ᵃ will later appear.

The top plate 34 has a large cut-out opening 36 (see Figure 5) formed therein, said plate 34 carrying a seat cushion 37 removably mounted on said plate 34 to make the space between the plates 34, 31 accessible and available for storage purposes. When the seat cushion 37 is removed, it is possible to take a grease gun and insert it through the cut out opening 36 and any one of the holes 32 to grease the nipples 24 located therebelow, in an obvious manner.

As shown best in Figures 2 and 7, the space above the top plate 34 and below the back rest 29 is occupied by a conveniently located tool box 38, access to which is had through the back wall plate 28 by means of latches 39.

The usual seat for tractors of this type was of such a width that it would fit transversely between the side body plates 17 or between the fenders 18, so that a tractioneer seated centrally on his seat would be located directly and comfortably behind the controls 21. The present seat is substantially wider, so that one end thereof is disposed over one of the fenders 18 and preferably substantially flush with the outer edge thereof, or slightly spaced therefrom, as appears in Figure 6. Thus, considering Figures 7 and 8 when the seat is in the full line position shown, that is, offset to the left, the right hand seat side wall 26 is secured by several bolts 40 to the inner face of the right hand body plate 17, while the left hand seat wall 31ᵃ is bolted to the left hand body plate 17 by bolts 41, as shown in Figure 7. With the seat thus oppositely secured to the body plates 17, the seat could not shift laterally. The left hand side wall 26 of the seat, in the position thereof just described, merely overhangs the edge of the left hand fender 18 in the manner shown in Figure 6.

Figure 7 also shows in dotted lines the offset position which the seat may assume at the right hand side with the right hand end of the seat disposed over the right hand fender 18. In such condition, the right hand seat wall 26, as shown in dotted lines in Figure 6, overhangs the edge of the right hand fender 18, while the left hand seat side wall 26 is secured by the bolts 41 to the side of the left hand body side plate 17. With this condition, the right hand wall or plate 31ᵃ abuts the right hand body plate 17 and is fastened thereto by the bolts 40.

Each fender 18 carries a foot rest 42 for the convenience of the extra man, who sits at the edge of the seat cushion 37, which extends over a fender.

Whether the seat structure is mounted offset to the right or to the left, four of the six holes 32 will always be in position to permit using a grease gun on the nipples 24 without necessitating removal of the entire seat structure. Further, one fender is always left clear of any obstruction to permit its use in locating any accessory parts and the like, which is highly desirable.

It can now be appreciated that the extra man can be seated on the seat alongside the tractioneer without cramping or crowding the latter, who still can sit comfortably behind his controls 21.

It is the intention to cover all changes and modifications not departing from the scope of the invention as hereinafter claimed.

What is claimed is:

1. In a tractor, a body portion, an operator's compartment on said body portion including a fuel tank at the front of said portion, fenders closing the sides of said compartment, tractor controls in said compartment, a two-man seat disposed transversely on the body and closing the rear of said compartment, said seat extending from the inner edge of one fender and over and to the outer edge of the other fender, and means for detachably securing the seat to the tractor.

2. In a tractor, a body portion having vertical side plates, fenders carried by the side plates, an operator's control compartment between said fenders, a two-man seat closing the rear of said compartment, said seat having side walls and being of a width to extend from substantially the outer edge of one fender to the body side plate to which the other fender is connected, said seat including spaced wall members between its side walls, and means for detachably mounting the seat by connecting one seat side wall member to one of said body plates and one of said spaced wall members to the other body plate.

3. In a tractor, a body portion, an operator's compartment located thereon and delineated at its sides by body side plates, fenders on said side plates, a two-man seat closing the rear of said compartment and extending transversely from the outer edge of one fender and thereover to the body side plate on the opposite side of the compartment, the seat having depending side walls, one of which is adapted to be detachably secured to one of the body side plates mentioned, and spaced wall members included in the seat structure and located between the side walls thereof, one of said wall members adapted to be secured to the other of said body side plates.

4. In a tractor, a body portion, an operator's compartment located thereon and delineated at its sides by longitudinal fenders carried by the body, a transversely disposed seat structure closing the rear of said compartment, said seat being removably mounted and being of a width to extend from the inner edge of one fender to the outer edge of and over the other fender, said seat adapted to be so mounted with respect to either side of the body and either fender.

5. In a tractor, a body portion, an operator's compartment thereon and delineated at its sides by vertical side plates carried by the body, a side fender carried on each side plate above the level of the top of said body, a transverse seat structure closing the rear of said compartment and having a side wall at each end thereof, controls in said compartment including horizontal connections extending rearwardly under said seat, a false bottom associated with the seat structure and connected to said side walls and located above said horizontal connections thereby providing a space to accommodate the latter, a seat cushion supporting plate connected to the side walls and raised above the false bottom, a seat cushion removably carried on the said supporting plate, said seat structure being wider than the space between the body side plates so that one end of the seat structure is located over one of the fenders, means for removably connecting one seat side wall to a body plate, spaced walls included in the seat structure and located between the side walls thereof, and means for connecting one of said spaced walls to the opposite body side plate.

6. In a tractor, a body portion, an operator's compartment thereon and delineated at its sides by longitudinal fenders arranged at a level higher than the floor of said compartment, a seat structure disposed transversely across the rear end of said compartment to close the same, said seat being of a width to extend from the inner edge of one fender to the outer edge of and over the other fender, and a foot rest on the fender over which the seat extends.

DAVID B. BAKER.
NORMAN O. PANZEGRAU.
CLIFFORD R. ROGERS.